United States Patent [19]
Nagata et al.

[11] Patent Number: 5,134,899
[45] Date of Patent: Aug. 4, 1992

[54] STEERING WHEEL HAVING BOSS AND BOSS PLATE RELATIVE ROTATION PREVENTION MEANS

[75] Inventors: Atsushi Nagata; Suzuaki Hongou; Yoshiyuki Fujita; Katsunobu Sakane, all of Aichi, Japan

[73] Assignee: Toyoda Gosei Co., Ltd., Nishikasugai, Japan

[21] Appl. No.: 676,346

[22] Filed: Mar. 28, 1991

[30] Foreign Application Priority Data

Mar. 30, 1990 [JP] Japan .................................. 2-085373
Oct. 30, 1990 [JP] Japan .................................. 2-294210

[51] Int. Cl.$^5$ .............................................. B62D 1/04
[52] U.S. Cl. ...................................... 74/552; 280/777
[58] Field of Search .................. 74/552; 280/777, 778, 280/731, 750; D8/303; 29/894.1

[56] References Cited

U.S. PATENT DOCUMENTS

| | | | |
|---|---|---|---|
| 4,280,372 | 7/1981 | Van Wecklin, Jr. ................ | 74/552 |
| 4,390,193 | 6/1983 | Strahan et al. .................... | 74/552 X |
| 4,485,371 | 11/1984 | Yamada et al. ................... | 74/552 X |
| 4,674,354 | 6/1987 | Brand ................................ | 74/552 X |
| 4,721,008 | 1/1988 | Stoops et al. .................... | 74/552 |
| 4,829,848 | 5/1989 | Shinto et al. ..................... | 74/552 |
| 4,879,923 | 11/1989 | Nagata .............................. | 74/552 |
| 4,943,028 | 7/1990 | Hoffmann et al. ............. | 280/777 X |

FOREIGN PATENT DOCUMENTS

| | | |
|---|---|---|
| 59-89265 | 5/1984 | Japan . |
| 62-163861 | 7/1987 | Japan . |
| 62-163862 | 7/1987 | Japan . |

Primary Examiner—Rodney H. Bonck
Assistant Examiner—Daniel Wittels
Attorney, Agent, or Firm—Cushman, Darby & Cushman

[57] ABSTRACT

A steering wheel having a ring portion, a boss portion arranged at the center of the ring portion, and a spoke portion connecting the boss portion with the ring portion, and in which the boss portion includes a boss and a boss plate, the boss having non-circular surfaces formed on the outer peripheral surface of the boss, the boss plate being connected with the spoke portion and with the upper surface of the boss by resistance welding and having flexible portions and restricting projections located around the center of the boss. The flexible portions provide an energy absorbing function and non-circular surfaces of the boss and the restricting projections of the boss plate prevent rotation of the boss plate relative to the boss when the welding portion happens to break.

6 Claims, 6 Drawing Sheets

STEERING WHEEL HAVING BOSS AND BOSS PLATE RELATIVE ROTATION PREVENTION MEANS

BACKGROUND OF THE INVENTION

1. Field of the Invention

The present invention relates to a steering wheel of a motorcar, and in particular, to a steering wheel in which a boss and a boss plate are connected with each other by means of resistance welding, and flexible portions are provided in the boss plate for allowing a plastic deformation of the boss plate in such a manner that, when a ring portion of the steering wheel suffers an impact force, the plane defined by the ring portion is so inclined as to become perpendicular to the direction of the impact force, namely, as to achieve a so-called self-aligning function.

2. Description of the Prior Art

Technical arts for connecting plate-like spokes of a steering wheel with a boss of the same by resistance welding are already disclosed in Japanese Patent Unexamined Publication No. 62-163861 and Japanese Patent Unexamined Publication No. 62-163862. Therein, the boss is composed of two parts divided in the axial direction, and each part has a flange portion extended from the periphery of the boss. The boss is formed with a polygonal portion serving as a rotation preventing means; and the boss is connected with the plate-like spokes by means of welding at the periphery of the boss and the surfaces of the flanges. As a result, the sizes of the boss and the plate-like spokes become greater.

SUMMARY OF THE INVENTION

The object of the present invention is to provide a steering wheel comprising a boss of small size connected with a boss plate by means of resistance welding, the boss plate having a so-called self aligning function.

The above-mentioned object is achieved by a steering wheel according to the present invention, which comprises a ring portion, a boss portion arranged at the center of the ring portion, and a spoke portion connecting the boss portion with the ring portion; the boss portion including a boss and a boss plate connected with the spoke portion and by means of resistance welding; with the upper surface of the boss the boss plate having an upper surface abutted by means of nut and a lower surface opposite to the upper surface and connected with the upper surface of the boss by means of resistance welding and including flexible portions for allowing a plastic deformation of the boss plate in such a manner that, when a ring portion of the steering wheel suffers an impact force, the plane defined by the ring portion is so inclined as to become substantially perpendicular to the direction of the impact force; and the boss and the boss plate being formed with a relative rotation preventing means for preventing the boss plate from rotating relative to the boss; and the above-mentioned relative rotation preventing means including non-circular surfaces formed on the outer peripheral surface of the boss and projections projecting downwards from the lower surface of the boss plate and adapted to abut against the non-circular surface.

The other objects, constitutions, functions and advantages of the present invention will become more clear in the following description relating to the embodiments referring to the drawings.

DESCRIPTION OF THE PREFERRED EMBODIMENTS

FIGS. 1 to 4 show, a first embodiment of the present invention as described below.

Figure 3:
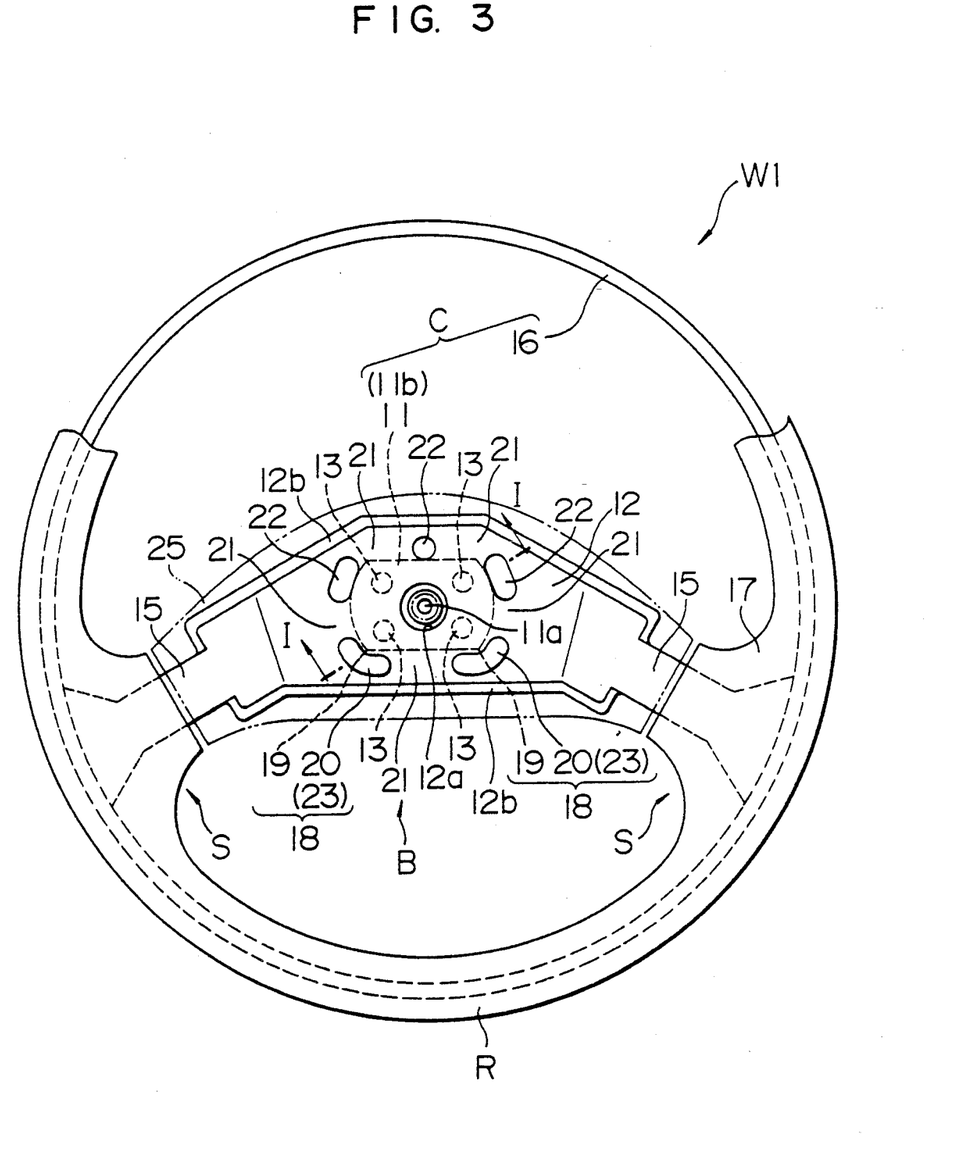
FIG. 3 is a plan view of the same embodiment.

A steering wheel W1 in the first embodiment is, as shown in FIG. 3, composed of a ring portion R, a boss portion B located at the center of the ring portion R, and two spoke portions S radially outwardly extending from the boss portion B and connecting the boss portion B with the ring portion R.

In the ring portion R is arranged a ring portion core metal 16 made of a steel pipe.

In each of the spoke portions S is arranged a spoke portion core metal 15 made of a steel plate connected with the ring portion metal core 16 by welding.

A covering layer 17 made of a synthetic resin such as a soft urethane is provided at regions along the ring portion metal core 16 and along the spoke portion core metal 15 on the side of ring portion R.

Figure 1:
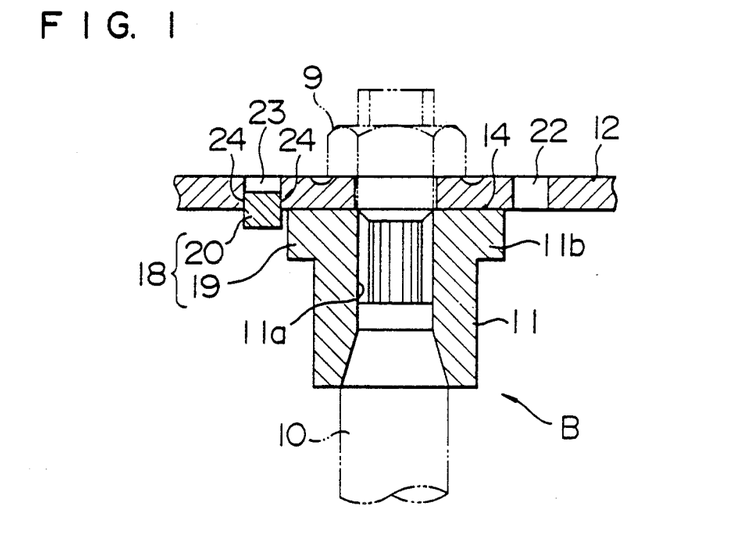
FIG. 1 is a partial sectional view of a first embodiment of the present invention taken along the line I—I of FIG. 3.

The boss portion B is composed of a boss 11 made of steel and formed with a fit hole 11a to be connected with a steering shaft 10 and a boss plate 12 connected with the boss 11 by welding.

In this embodiment, the left and right spoke portion core metals 15, 15 and the boss plate 12 are integrated into one unit.

Reference numeral 12b denotes a rib provided for reinforcing the peripheral portion so that the flexible portions 21 (described later) of the boss plate 12 are surely deformed, and reference numeral 25 denotes a pad covering the upper portion of the boss portion B.

Figure 2:
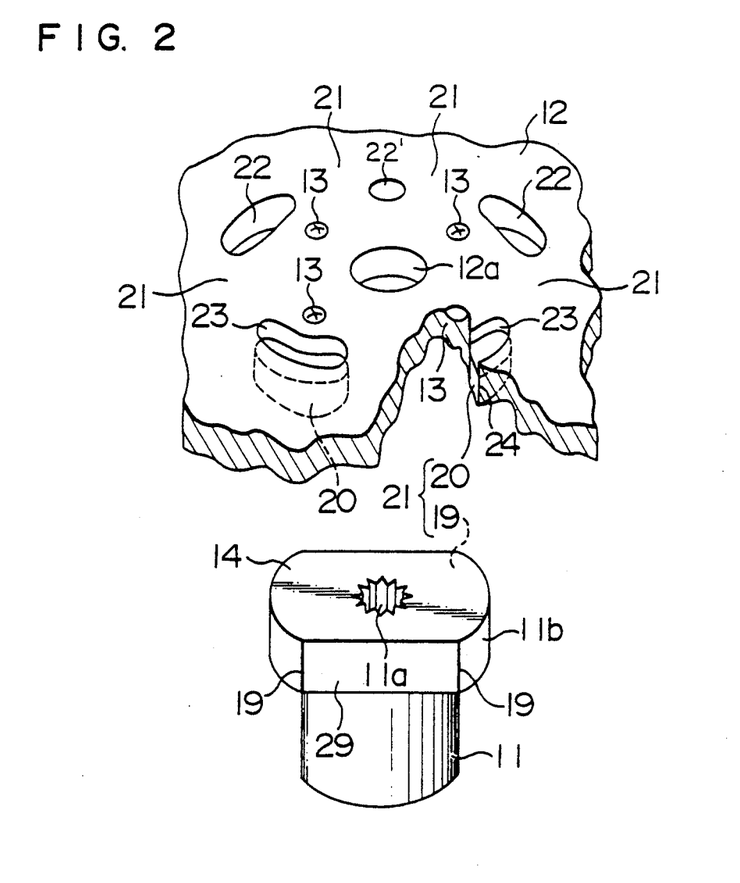
FIG. 2 is a perspective view of a boss and a boss plate of the same embodiment before being welded with each other.

As shown in FIGS. 1 to 3, at the upper portion of the boss 11 is formed a flange portion 11b which has an outer circumferential surface including non-circular surfaces 19, 19, 29 constituting a part of a relative rotation preventing means 18.

On the other hand, the boss plate 12 is formed at the center thereof with an insertion hole 12a into which a steering shaft 10 is to be inserted, and with a plurality of welding projections 13 at predetermined positions around the insertion hole 12a for carrying out resistance welding between the boss plate 12 and the boss 11 through a welding surface 14 defined by the upper surface of the boss 11.

Further, the boss plate 12 is formed with a plurality of through holes 22, 22' and a plurality of recesses 23 at predetermined positions distributed near the periphery of the flange portion 11b of the boss 11 with a center coincident with the center of the insertion hole 12a for the purpose of providing flexible portions 21 for effecting a self-aligning function.

Each of the through holes 22 is bored by using a punching press and each of the recesses 23 is formed by stopping a punching action half way through a set cutting process. Therefore, at the underside of the recesses 23 are formed projecting portions protruding downwards, which define restricting projections 20 and construct the relative rotation preventing means 18 in cooperation with the non-circular surfaces 19, 29 formed on the outer circumferential surface of the flange portion 11b of the boss 11.

Although the restricting projections 20 are sheared at the periphery thereof, there is no fear of dropping down of the restricting projection 20, because the restricting projection is strongly fit in the recess in the set cutting process. Further, since the periphery of each restricting projection 20 is sheared, there is not fear of increasing the limit load which produces a plastic deformation of the flexible portions 21 located between adjacent recesses 23 and between a through hole 22 and a recess 23.

Next, the manufacturing process for a steering wheel W1 according to this embodiment will be described below. Firstly, the boss plate 12 is disposed on the upper surface of the boss 11 at a position where the insertion hole 12a is coincident with the fit hole 11a; none of the restricting projections 20 contacts with any of the non-circular surfaces 19, 19, 29; and the welding projections 13 of the boss plate 12 abut against a welding surface 14 defined by the upper surface of the boss 11. Then, an electric current having a predetermined flow rate is applied to electrodes which are pressed on the boss 11 and on the boss plate 12, respectively, whereby the boss 11 and the boss plate 12 are connected with each other by means of resistance welding at near the contact portions therebetween. The reason for preventing the restricting projections 20 from contacting with the non-circular surfaces 19, 29 is that, when the boss 11 contacts with the boss plate 12 at portions other than the welding projections 13, a greater flow rate of the electric current is required for resistance welding. In case the restricting projections are melted and welded to the boss 11, a separation of the melted and welded portions from the boss 11 will cause a separation of the restricting projections 20 from the boss plate 12, thereby making it impossible to prevent the relative rotation.

Further, together with the welding of the boss 11 with the boss plate 12, the spoke portions 15, 15 integrated with the boss plate 12 are connected with the ring portion core metal 16 by utilizing resistance welding.

The steering wheel core metal C constructed by connecting the core metals 11, 12, 15, and 16 of various portions with one another is set in a predetermined molding die, and a covering layer 17 is formed. After then, a pad 25 is arranged over the boss portion B with a predetermined horn switch mechanism, etc. interposed therebetween and a lower cover (not shown) is arranged under the boss portion B, thereby completing the manufacturing process of a steering wheel W1 of this embodiment.

Figure 4:
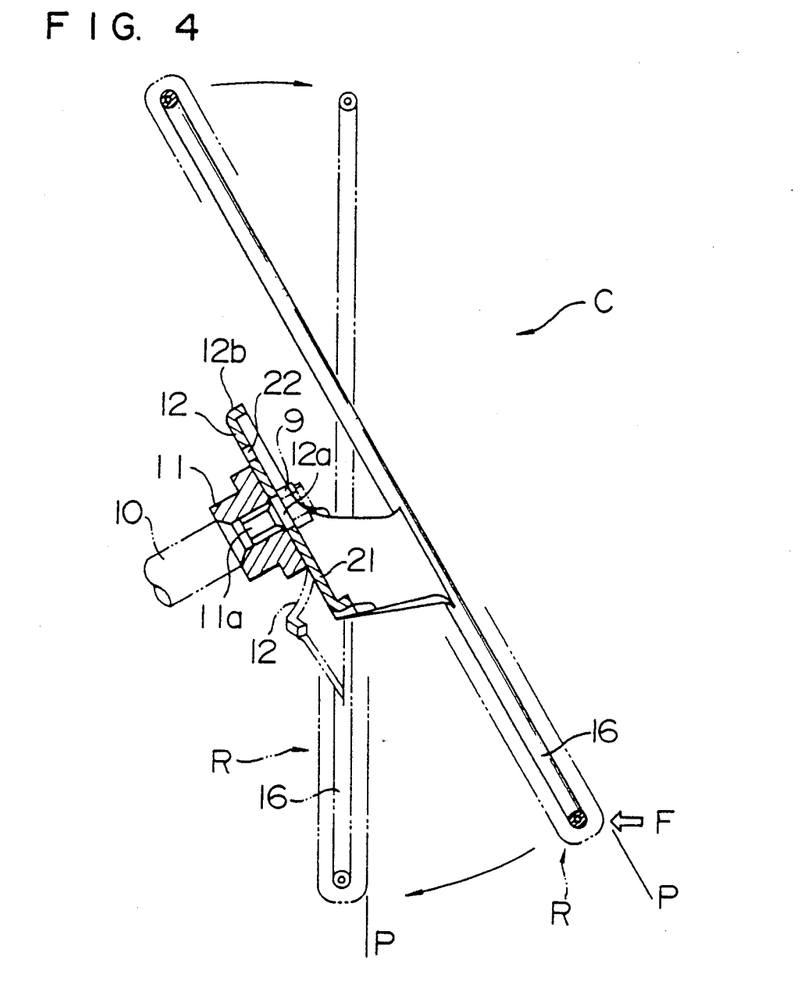
FIG. 4 is a schematic view showing a self-aligning function of the steering wheel of the same embodiment.

After the steering wheel W1 has been mounted on the steering shaft 10 by means of a nut 9, should the welding portion near the welding projection 13 happens to break, the restricting projections 20. 20 arranged around the non-circular surfaces 19, 19, 29 of the boss 11 will abut against the non-circular surfaces 19, 19, 29, thereby making it possible to prevent a rotation of the boss plate 12 relative to the boss 11. The flexible portions 21 located between adjacent recesses 23, between adjacent through holes 22 and between the through holes 22 and recesses 23 and can be easily, plastically deformed due to these holes and recesses. Therefore, when an impact force F acts on the ring portion R, as shown in FIG. 4, the flexible portions 21 are plastically deformed so as to rotate the plane P of the ring portion R towards a plane perpendicular to the direction of the impact force F, thereby achieving a so-called self-aligning function.

As a result, in the steering wheel W1 according to this embodiment, although the boss 11 is connected with the boss plate 12 by resistance welding and relative rotation preventing means 18 is providing along with self-aligning function, the prior-art increase in size of the boss 11 and the boss plate 12 is prevented, and a steering wheel having a light weight and a low cost resulting from the decrease of material cost is obtained. Further, since the restricting projections 20 for constructing a relative rotation preventing means 18 and the recesses 23 for achieving a self-aligning function can be easily fabricated with decreased labor at the same time, the manufacturing hours is decreased, and the manufacturing cost is further lowered.

Further, although two restricting projections 20 are provided in this embodiment, a single projection can achieve the same effect, of course.

Still further, although the non-circular portions 19, 29 of the boss 11 are defined by the corners of the flange portion 11b in this embodiment, they may be also defined by a plane portion 29 corresponding to the restricting projections 20 (refer to FIG. 2), in so far as their shapes are non-circular.

In addition, the non-circular surfaces 19, 29 are not limited to corner portions or planes, but may be shaped otherwise, for, an elliptical surface, only excluding a circular shape having its center coincident with the center of the boss 11 which is to be connected with a steering shaft not shown.

In case the non-circular surface is shaped as a plane, it may be preferred to provide two restricting projections at near the left side and the right side of the non-circular surface 29, respectively, for preventing relative rotation caused by play, in case the ring portion R is rotated both clockwise and counterclockwise.

Although, in this embodiment, a flange portion 11b having a non-circular outer surface is formed at the upper portion of the boss 11, the flange portion 11b is not always required, but the boss 11 may be formed to have a non-circular surface at a portion of the outer circumferential surface of the boss 11 corresponding to the restricting projections 20. In such a case, the boss 11b become more compact. A second embodiment of the present invention is described relative to FIG. 5. A steering wheel according to this embodiment comprises also a ring portion R, a boss portion B arranged at the center of the ring portion R, and two spoke portions S extending radially outwardly for connecting the boss portion B with the ring portion R.

Figure 5:
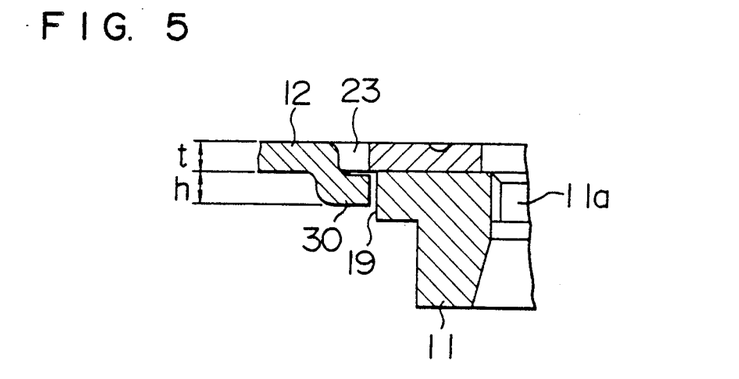
FIG. 5 is a partially sectional view of a second embodiment of the present invention showing a restricting projection.

The detailed structures of the ring portion R, the boss portion B and the spoke portion S are the same as those of the first embodiment.

FIGS. 6 to 9, dissolve third embodiment of the present invention.

Figure 8:
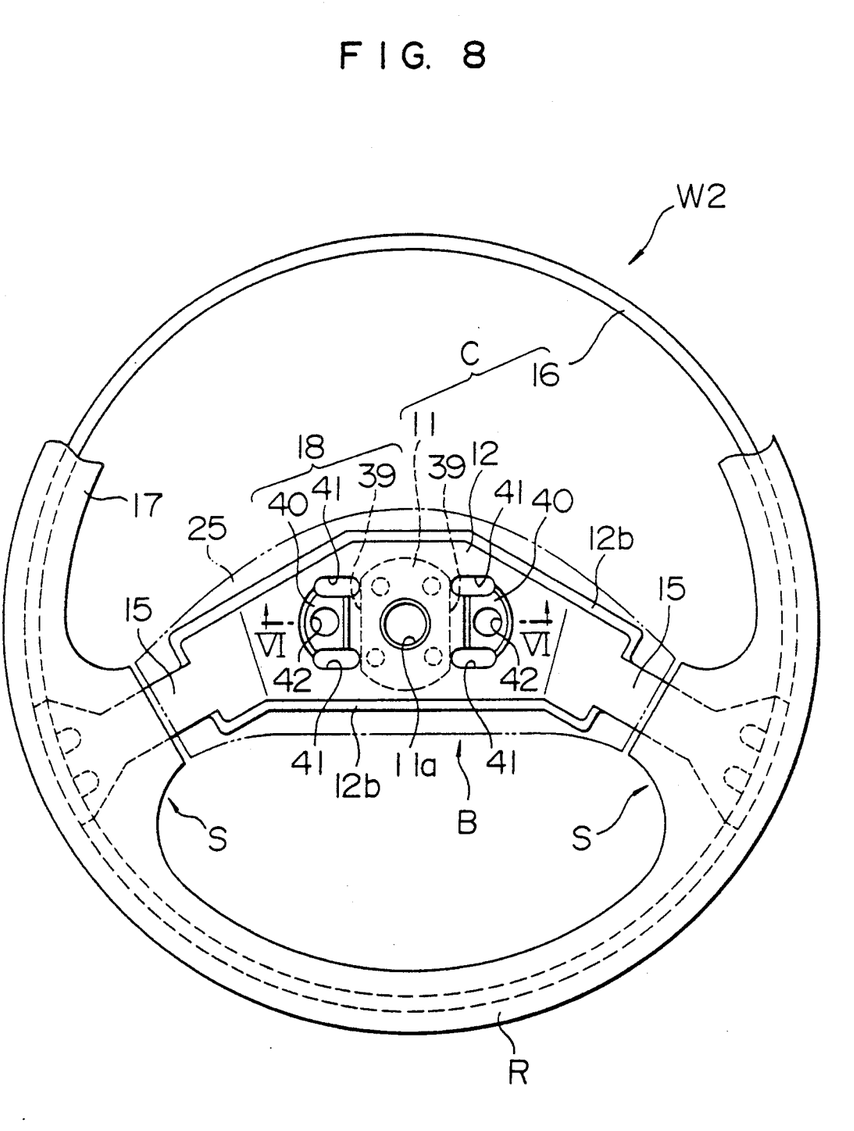
FIG. 8 is a plan view of the same embodiment.

A steering wheel W2 according to this embodiment comprises also, as shown in FIG. 8, a ring portion R, a boss portion B arranged at the center of the ring portion R, and two spoke portions S extending radially outwardly for connecting the boss portion B with the ring portion R.

The detailed structures of the ring portion R, the boss portion B and the spoke portions S are the same as those of the first embodiment.

Namely, in the ring portion R is a ring portion core metal 16 made of a steel pipe.

In each of the spoke portions S is arranged a spoke portion core metal 15 made of a steel plate and connected with the ring portion metal core 16 by welding.

Figure 6:
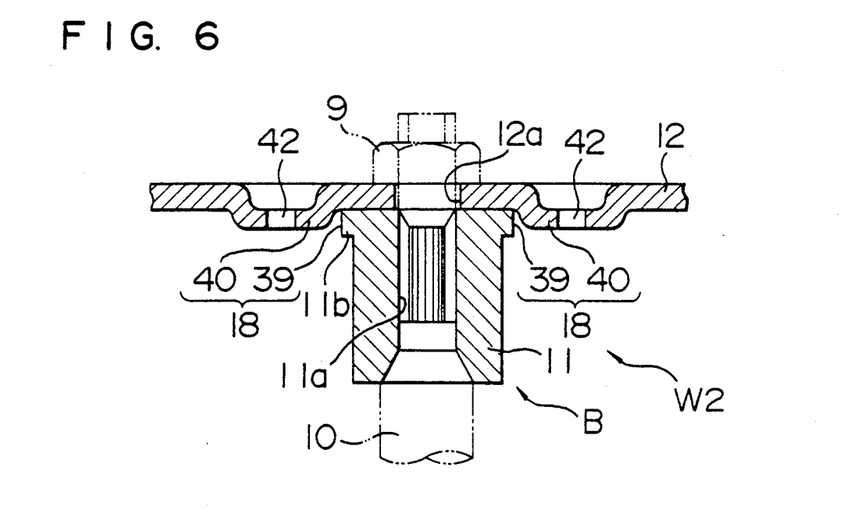
FIG. 6 is a partial sectional view of a second embodiment of the present invention taken along the line VI—VI of FIG. 8.

The boss portion B is composed of a boss 11 made of steel and formed with a fit hole 11a to be connected with a steering shaft 10 and a boss plate 12 to be connected with the boss 11 by welding.

Figure 7:
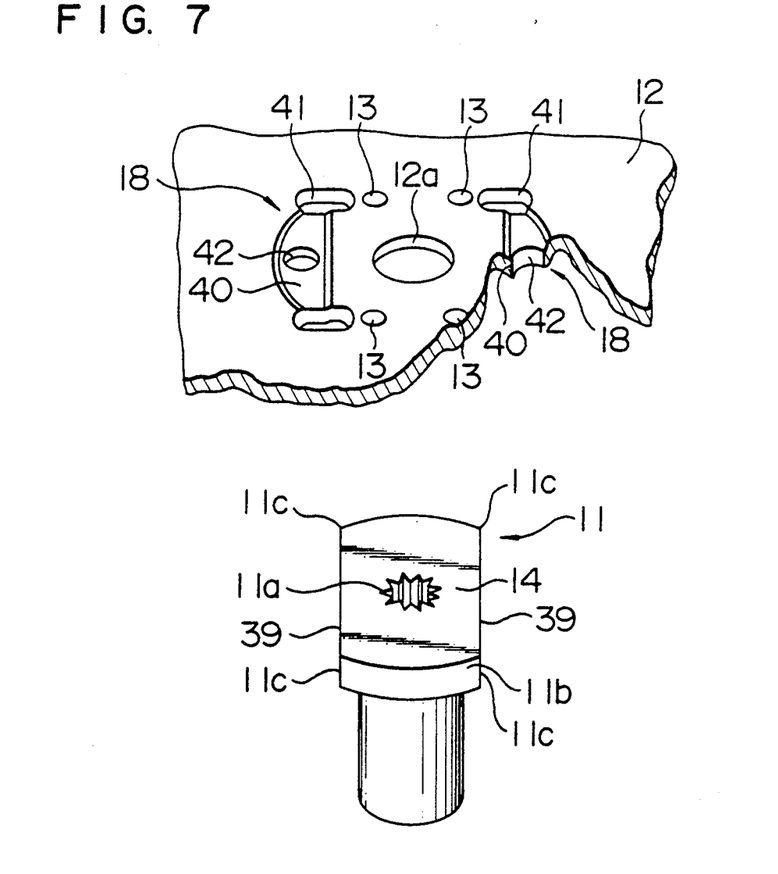
FIG. 7 is a perspective view showing a boss and a boss plate of the same embodiment before welded with each other.

As shown in FIGS. 6 to 8, at the upper portion of the boss 11 is formed a flange portion 11b having an outer circumferential surface of a non-circular shape, this outer surface being formed with non-circular surfaces 39, 39 which are a part of a relative rotation preventing means 18.

On the other hand, the boss plate 12 is formed with an insertion hole 12a at the center thereof into which the steering shaft 10 is to be inserted, and with a plurality of welding projections 13 at predetermined positions around the insertion hole 12a for carrying out resistance welding between the boss plate 12 and the boss 11 through a welding surface 14 defined by the upper surface of the boss 11.

In this embodiment, the boss plate 12 is formed with curved portions 40, 40 bulged downwardly at predetermined positions distributed near the periphery of the flange portion 11b of the boss 11, the curved portions 40, 40 serving as flexible portions for effecting a self-aligning function.

Each of the curved portions 40 is formed with through holes 41 at the periphery thereof and a through hole 42 functioning as a puller hole at the center of the same.

Next, the manufacturing process for a steering wheel W2 according to this embodiment will be described below. Firstly, the boss plate 12 is disposed on the upper surface of the boss 11 at a position where the insertion hole 12a is coincident with the fit hole 11a; none of the curved portions 40 contacts with any of the non-circular surfaces 39, 39; and the welding projections 13 of the boss plate 12 abut against a welding surface 14 defined by the upper surface of the boss 11. Then, an electric current having a predetermined flow rate is applied to electrodes which are pressed on the boss 11 and on the boss plate 12, respectively, whereby the boss 11 and the boss plate 12 are connected with each other by means of resistance welding at near the contact portions therebetween.

The reason for preventing the curved portions 40 from contacting with the non-circular surfaces 39 is that, when the boss 11 contacts with the boss plate 12 at portions other than the welding projections 13, a greater flow rate of the electric current is required for carrying out resistance welding, curved portions 40 are melted and welded to the boss 11, a separation of the melted and welded portion may cause a separation of the curved portions 40, thereby making it impossible to prevent the relative rotation.

Further, together with the welding of the boss 11 with the boss plate 12, the spoke portions 15, 15 integrated with the boss plate 12 are connected with the ring portion core metal 16 by utilizing resistance welding.

The steering wheel core metal C composed of the core metals 11, 12, 15, and 16 of various portions connected with one another is set in a predetermined molding die, and a covering layer 17 is formed. After then, a pad 25 is arranged over the boss portion B with a predetermined horn switch mechanism, etc. interposed therebetween and a lower cover (not shown) is arranged under the boss portion B, thereby completing the manufacturing process of steering wheel W2 of this embodiment.

Figure 9:
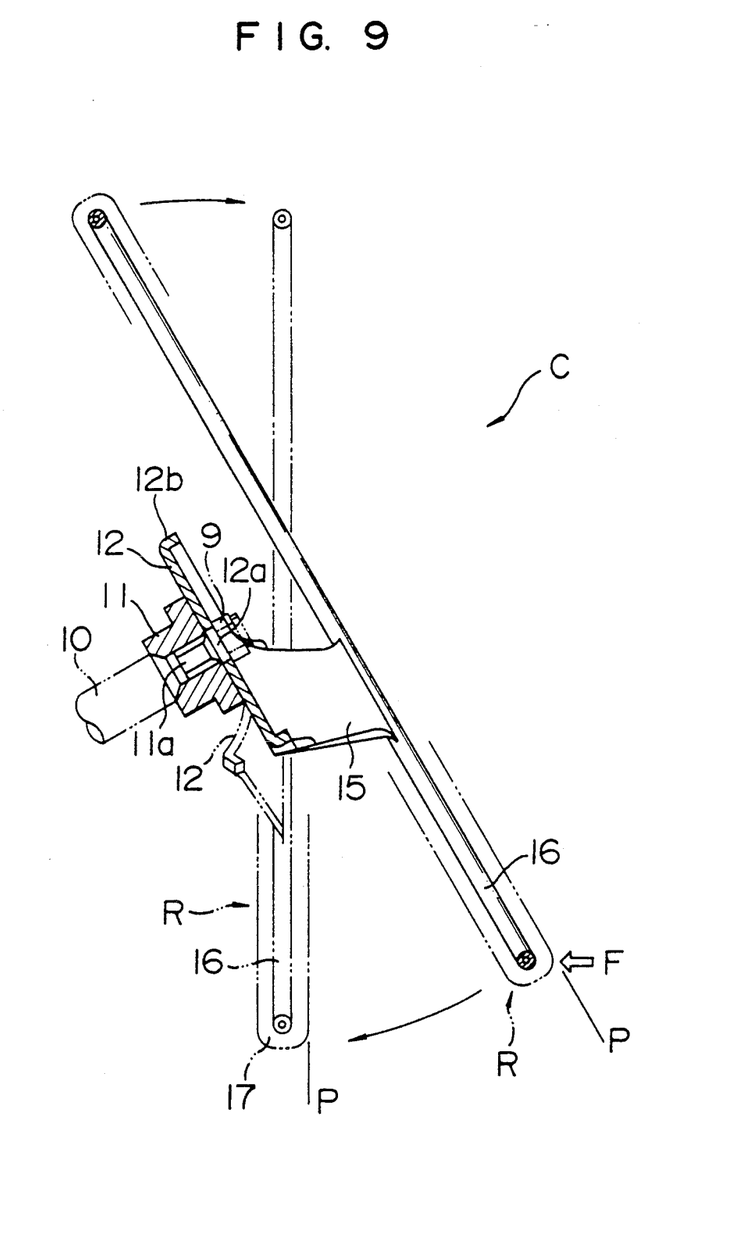
FIG. 9 is a schematic view showing a self-aligning function of the steering wheel of the same embodiment.

After the steering wheel W2 has been mounted on the steering shaft 10 by means of a nut 9, should the welding portion near the welding projection 13 of the boss plate 12 to happen to break, the curved portions 40, 40 arranged around the non-circular surfaces 39, 39 of the boss 11 abut against the non-circular surfaces 39, 39, thereby making it possible to prevent a rotation of the boss plate 12 relative to the boss 11. The recessed curved portion 40 can be easily, plastically deformed due to the existence of through holes 41, 42 and curved shape of these portions which function as a flexible portion. Therefore, when an impact force F acts on the ring portion R, as shown in FIG. 9, the curved portions 40 are plastically deformed so as to rotate the plane P of the ring portion R towards a plane perpendicular to the direction of the impact force F, thereby achieving a so-called self-aligning function.

As a result, in the steering wheel W2 according to this embodiment, although the boss 11 is connected with the boss plate 12 by resistance welding as providing a relative rotation preventing means 18 and achieving a self-aligning function, the prior art increase in size of the boss 11 and the boss plate 12 is prevented, and a steering wheel having a light weight and a low cost resulting from the decrease of material cost is obtained. Further, since the relative rotation preventing means is constituted by the flexible portions 40 themselves, the manufacturing man-hours are decreased, and the manufacturing is further lowered.

Further, although two curved portions 40 are provided in this embodiment, a single curved portion or more than three curved portions also may have the same effect, of course.

Although, in this embodiment, each of the curved portions 40 includes the through holes 41 and 42, these through holes can be eliminated, if the thickness of the curved portion is decreased or the number of bent portions is increased for making the curved portions more flexible.

Although, in this embodiment, the boss 11 is formed with non-circular surfaces 39 of plane shape, the plane shape is not necessarily required, but instead, another curved surface such as an elliptical surface can be used, only excluding a circular arc shape having a center coincident with the center of the boss 11. Further, in case the curved portion 40 has a V-shape when viewed from above, it is possible to define the non-circular surface by corner portions 11c of the flange portion 11b of the boss 11 arranged correspondingly to the shape of the curved portion (refer to FIG. 7).

Although, in this embodiment, a flange portion 11b having a non-circular outer surface is formed at the upper portion of the boss 11, the flange portion is not always required, but the boss may be formed to have a non-circular surface at a portion of the outer circumferential surface of the boss 11 corresponding to the curved portions 40. In such a case, the boss becomes more compact.

What is claimed is:

1. A steering wheel, comprising:

a ring portion;

a base portion arranged at the center of said ring portion, and a spoke portion connecting said base portion with said ring portion, said boss portion including a boss and a boss plate, said boss plate being connected with said spoke portion and by means of resistance welding with an upper surface of said boss, said boss plate having an upper surface abutted by means of a nut and a lower surface opposite to said upper surface and connected with an upper surface of the boss by means of resistance welding and including flexible portions for allowing a plastic deformation of the boss plate in such a manner that, when said ring portion of the steering wheel suffers an impact force, the plane defined by said ring portion is so inclined as to become substantially perpendicular to the direction of said impact force, said boss and said boss plate being formed with a relative position preventing means for preventing said boss plate from rotating relative to said boss, and said relative rotation preventing means including non-circular surfaces formed on the outer peripheral surface of said boss and a radially inner surface of projecting protruding downwards from the lower surface of said boss plate and adapted to abut against said non-circular surfaces.

2. A steering wheel claimed in claim 1, wherein each of said flexible portions is constructed by providing through holes penetrating said boss plate and recesses formed by shearing the periphery thereof and pressing the sheared portions downwardly as forming restricting projections protruding downwards, said through holes and said recesses being located around the center of said boss plate, and said projections constructing said relative rotation preventing means and adapted to abut against said non circular surfaces are defined by said restricting projections.

3. A steering wheel claimed in claim 1, wherein the flexible portions are formed by providing curved portions, said curved portions being bent downwards from said boss plate and located at the periphery of said boss, and said projections constructing said relative rotation preventing means and adapted to abut against said non-circular surfaces are defined by said curved portions.

4. A steering wheel claimed in claim 3, wherein each of said curved portions includes through holes formed at the periphery of the curved portion.

5. A steering wheel, comprising a ring portion, a boss portion arranged at the center of said ring portion, and a spoke portion connecting said boss portion with said ring portion, said boss portion including a boss and a boss plate, said boss plate being connected with said spoke portion and by means of resistance welding with an upper surface of said boss, said boss plate including flexible portions for allowing a plastic deformation of the boss plate in such a manner that, when said ring portion of the steering wheel suffers an impact force, the plane defined by said ring portion is so inclined as to become substantially perpendicular to the direction of said impact force, each said flexible portion including through holes penetrating said boss plate and recesses formed by shearing the periphery thereof and pressing the sheared portions downward as forming restricting projections protruding downwards, said through holes and said recesses being located around the center of said relative rotation preventive means and adapted to abut against said non circular surfaces are defined by said restricting projections, said boss and said boss plate being formed with a relative rotation preventing means for preventing said boss plate from rotating relative to said boss, and said relative rotation preventing means including non-circular surfaces formed on the outer peripheral surface of said boss and projections protruding downwards from the lower surface of said boss plate and adapted to abut against said noncircular surfaces.

6. A steering wheel, comprising a ring portion, a boss portion arranged at the center of said ring portion, and a spoke portion connecting said boss portion with said ring portion, said ring portion including a boss and a boss plate, said boss plate being connected with said spoke portion and by means of resistance welding with an upper surface of said boss, said boss plate including flexible portions for allowing a plastic deformation of the boss plate in such a manner that, when said ring portion of the steering wheel suffers an impact force, the plane defined by said ring portion is so inclined as to become substantially perpendicular to the direction of said impact force, said flexible portions being formed by providing curved portions, said curved portions being bent downwards from said boss plate and located at the periphery of said boss, and said projections constructing said relative rotation preventing means and adapted to abut against said non-circular surfaces are defined by said curved portions, each of said curved portions including through holes formed at the periphery of the curved portion, said boss and said boss plate being formed with relative rotation preventing means for preventing said boss plate from rotating relative to said boss, and said relative rotation preventing means including non-circular surfaces formed on an outer peripheral surface of said boss and projections protruding downwards from the lower surface of said boss plate and adapted to abut against said non-circular surfaces.

* * * * *